(12) United States Patent
Takahashi et al.

(10) Patent No.: US 8,150,218 B2
(45) Date of Patent: Apr. 3, 2012

(54) THERMO-OPTICAL PHASE SHIFTER

(75) Inventors: Morio Takahashi, Tokyo (JP); Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 281 days.

(21) Appl. No.: 12/530,588

(22) PCT Filed: Feb. 29, 2008

(86) PCT No.: PCT/JP2008/053608
§ 371 (c)(1),
(2), (4) Date: Sep. 9, 2009

(87) PCT Pub. No.: WO2008/111407
PCT Pub. Date: Sep. 18, 2008

(65) Prior Publication Data
US 2010/0111461 A1    May 6, 2010

(30) Foreign Application Priority Data
Mar. 9, 2007    (JP) .................. 2007-060167

(51) Int. Cl.
*G02F 1/01* (2006.01)
(52) U.S. Cl. .............. 385/1; 385/2; 385/14; 385/132
(58) Field of Classification Search .............. 385/1, 2, 385/3, 14, 40, 41, 129, 130, 131, 132
See application file for complete search history.

(56) References Cited

U.S. PATENT DOCUMENTS

| | | | |
|---|---|---|---|
| 6,870,979 B2 * | 3/2005 | Kawashima et al. | 385/14 |
| 7,333,679 B2 * | 2/2008 | Takahashi | 385/1 |
| 7,565,038 B2 * | 7/2009 | Earnshaw | 385/1 |
| 7,630,596 B2 * | 12/2009 | Watanabe | 385/14 |
| 2004/0264836 A1 * | 12/2004 | Kawashima et al. | 385/14 |
| 2005/0169566 A1 * | 8/2005 | Takahashi | 385/1 |
| 2010/0111461 A1 * | 5/2010 | Takahashi et al. | 385/1 |

FOREIGN PATENT DOCUMENTS

| | | |
|---|---|---|
| EP | 1699120 A2 | 9/2006 |
| JP | 64-077002 A | 3/1989 |
| JP | 03-267902 A | 11/1991 |
| JP | 06-160174 | 6/1994 |
| JP | 07-021598 | 1/1995 |
| JP | 2004-037524 A | 2/2004 |
| JP | 2004-287093 A | 10/2004 |
| JP | 2005-055882 A | 3/2005 |

OTHER PUBLICATIONS

International Search Report for PCT/JP2008/053608 mailed Jun. 17, 2008.
H. Yamazaki et al., "A Turnable Laser Consisting of Waveguide Ring Resonator and Semi-conductor Optical Amplifier", 2005 Nen IEICE Electronics Society Taikai, Sep. 7, 2005, C-3-89, p. 233.
Supplementary European Search Report for EP 08 71 2130 issued May 25, 2010.

* cited by examiner

*Primary Examiner* — Brian Healy

(57) ABSTRACT

Provided is a thermo-optical phase shifter including a composite body having an optical waveguide formed by a core and a clad and having a ratio Δ of a difference between a core refractivity and a clad refractivity against the core refractivity which is 4% or above and a heater attached to the optical waveguide. The composite body has: a bridge structure portion arranged along a substrate surface and separate from the substrate surface via a void; and a fixed portion which supports the bridge structure portion with respect to the substrate and is continuous to the both ends of the bridge structure portion. The bridge structure has a half-circle-arc shape in the plane along the surface of the substrate.

20 Claims, 9 Drawing Sheets

FIG. 17
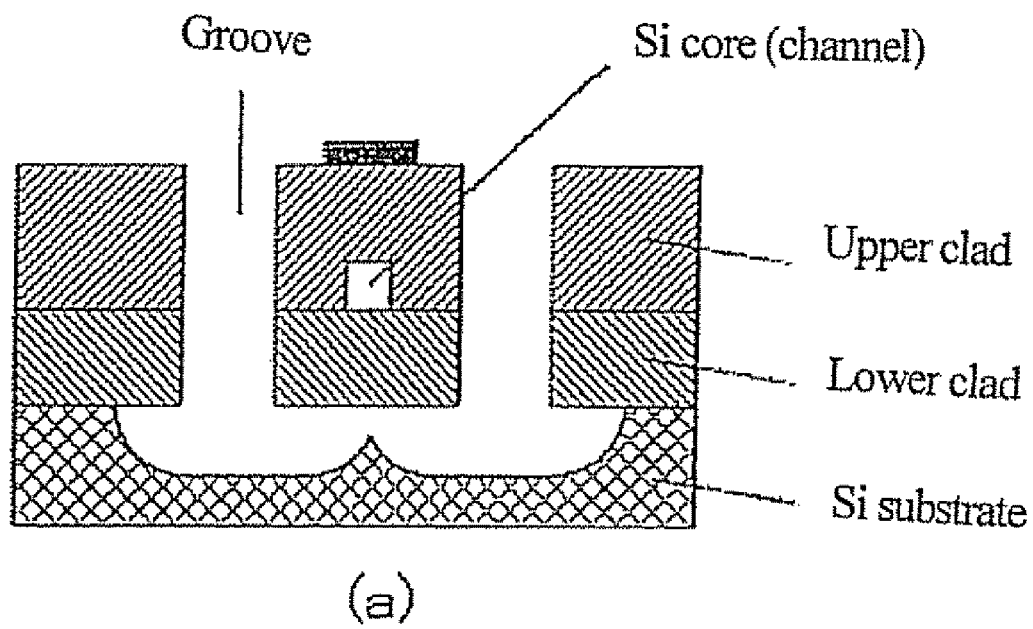
(a)
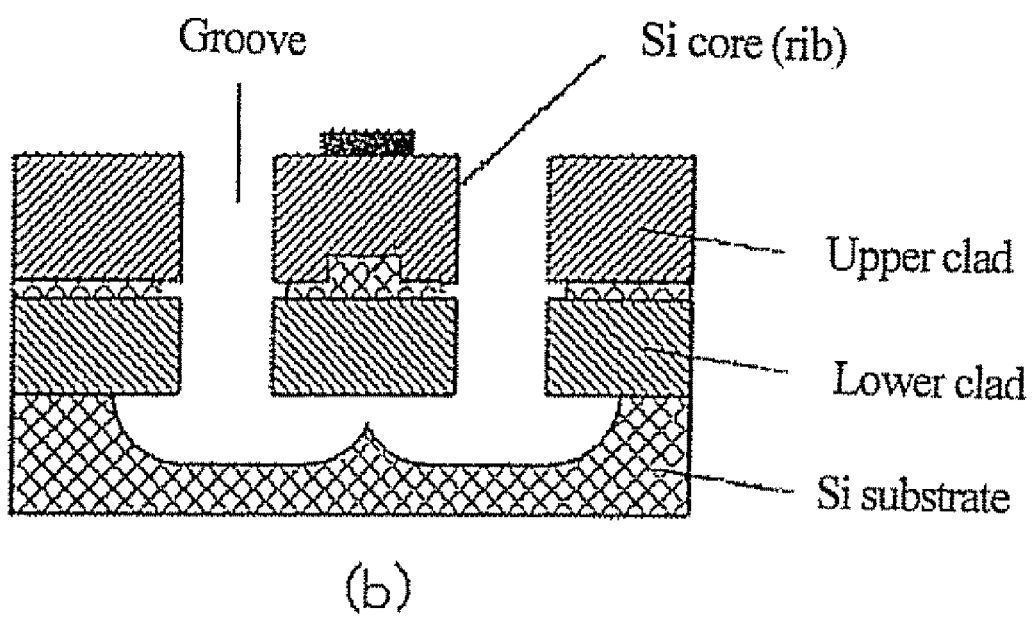
(b)

THERMO-OPTICAL PHASE SHIFTER

TECHNICAL FIELD

The present invention relates to a thermo-optical phase shifter, and more particularly to a thermo-optical phase shifter having a bridge structure that is employed for the sake of reducing power consumption.

BACKGROUND ART

In the field of optical communication, multichannel configurations have been developed rapidly with the appearance of wavelength division multiplexing (WDM) communication systems. When channel-by-channel functional controls are attempted accordingly, for example, to uniformize the channel powers or to perform route switching, optical devices as many as correspond to the number of channels become necessary.

Under the circumstances, there has been a growing need in recent times for small-sized optical circuit components that are applicable to optical switches and the like and are capable of high density integration. Of such circuit components, planar lightwave circuit devices (PLCs) using a thermo-optical phase shifter have the advantages of having excellent manufacturability and integratability and being advantageous for functional sophistication and large scale integration since their manufacturing processes can use semiconductor circuit manufacturing technologies.

A thermo-optical phase shifter is typically manufactured in the following manner. Initially, an optical waveguide composed of a clad layer and a core is formed on a substrate. A metal thin film or the like is then deposited on the optical waveguide, and is processed into a thin wire shape along the optical waveguide so that the resulting wire-shaped metal thin film can be energized. When electric power is applied from an external power supply to the wire-shaped metal thin film, heat occurs from the electric resistance of the wire-shaped metal thin film. In other words, the wire-shaped metal thin film functions as a heater for heating the optical waveguide. The heat generated by the heater is transferred through the clad layer to reach the core of the optical waveguide. As a result, the optical waveguide increases in refractive index in the area heated by the heater, and the change in the refractive index can be used to construct a functional optical device such as an optical switch.

A single optical circuit may include a plurality of thermo-optical phase shifters for the sake of multichannel configuration. In such cases, the power consumption of the entire optical circuit can be extremely high if each single thermo-optical phase shifter consumes high power. Among thermo-optical phase shifters that have been put to practical use heretofore, a Mach-Zehnder optical switch, for example, consumes around 400 mW of power to switch a single channel of light. For example, to control a 40-channel optical communication circuit with an optical switch using the foregoing thermo-optical phase shifter on each channel, a maximum power of 40×400 mW=16000 mW=16 W is required. In fact, optical switches near as much as the square of the number of channels are often needed in order to perform route setting and the like on all the channels. In such a case, the power consumption can reach up to 40×40×400 mW=640 W.

For the purpose of preventing the dissipation of the heat generated by the heater to the substrate so as to reduce the power consumption of the thermo-optical phase shifter, it has been proposed to remove a sacrifice layer located under the optical waveguide to construct the optical waveguide in a bridge structure (for example, see JP-A-2004-37524 [PTL1]). Such a technology makes it possible to effectively confine the heat generated by the heater within the optical waveguide for use, thereby reducing the power consumption of the thermo-optical phase shifter significantly.

Now, high-Δ optical waveguide technology has been astonishingly advancing recently with the aim of achieving integrated optical devices of even smaller sizes and higher densities. That is, the confinement of light into the optical waveguide core is further intensified to minimize the bending loss so that curved waveguides, which have been redundant in conventional optical waveguide devices, can be reduced or shortened significantly. Conventional optical waveguide core materials have limitations in achieving such a high-Δ optical waveguide, and SiON, Si, and the like are used as new core materials.

As described above, the device performances strongly desired at present include low power consumption and small-sized integration, and the foregoing two technologies, namely, the heat insulation technology using a bridge structure and the high-Δ optical waveguide technology are attracting attention as important technologies.

The combination of such technologies has the following technical problems, however.

Optical waveguide core materials for constructing a high-Δ optical waveguide have coefficients of thermal expansion far different from those of clad materials. Manufacturing processes are also quite different from theretofore. Suppose, for example, that SiON, which has a wide range of adjustment in refractive index and is suitable for high refractive indexes, is used as the optical waveguide core material. In such a case, infrared absorptions due to O—H bond and N—H bond unique to SiON occur in the vicinity of 1500 nm, an infrared wavelength band for use in optical communication, with an increase in absorption loss. To reduce the absorption loss, annealing needs to be performed at temperatures above 1000° C. Such high temperature annealing makes the glass film closely packed, allowing the manufacturing of highly reliable devices. The high temperature annealing performed with different types of materials in contact with each other, however, can cause extremely large residual stress corresponding to a difference between the coefficients of thermal expansion inside the optical waveguide. Consequently, even if the same bridge structure is formed as in conventional low-Δ waveguides, the bridge formation simultaneously allows the optical waveguide portion that has been supported by the substrate to make a stress deformation freely, which results in the problem that the bridge structure of the optical waveguide breaks. The breakages are often in the connections between the bridge structure portion and a fixed portion that supports the bridge structure portion on the substrate at both ends. The reason of such breakages is that the force of the bridge structure to make a stress deformation concentrates on the connections. Moreover, as specifically described in an example in the foregoing PTL1, if the bridge structure portion including the optical waveguide and the heater has a straight shape, it is unpredictable whether the direction of the stress deformation is toward or away from the substrate, and whether or not the deformation occurs in a direction parallel with the substrate. The direction of the deformation varies depending on the surrounding circumstances at the moment when the bridge structure portion is separated from the substrate, and depending on the structural balance. Consequently, even if the bridge structure remains unbroken, it is difficult to manufacture with stability a thermo-optical phase shifter that has low power consumption performance and high optical characteristics.

PTL1 describes that the bridge structure portion is supported by a support column in order to reduce the degrees of freedom of the bridge structure portion in vertical directions (FIG. 3, etc).

PTL1 includes the description that the heater may have a curved shape if the heater is capable of generating heat to bring the optical waveguide core up to a desired temperature and induce a change in refractive index (paragraph [0095]). PTL1 also includes the description that the optical waveguide core is formed in a curved shape (claim 1, etc.). Nevertheless, PTL1 includes neither the description that the bridge structure portion is formed in a curved shape or, in particular, the description that the bridge structure portion using a high-$\Delta$ optical waveguide is formed in a curved shape, nor the description that the shape of the bridge structure portion is specified to reduce the residual stress and avoid a break of the structure, or to reduce the residual stress and avoid a break of the structure of the bridge structure portion using a high-$\Delta$ optical waveguide in particular.

Meanwhile, an optical waveguide for use in optical communications has also been proposed in which a curved portion is formed in a ridge structure so that the radius of curvature of the curved portion can be reduced even with suppression of light loss (for example, see JP-A-2004-287093 [PTL 2]). Nevertheless, PTL 2 includes neither the description that a bridge structure including an optical waveguide and a heater is formed, nor that the shape of the bridge structure is specified to reduce the residual stress and avoid a break of the structure, or to reduce the residual stress and avoid a break of the structure of the bridge structure portion using a high-$\Delta$ optical waveguide in particular.

PTL 1: JP-A-2004-37524
PTL 2: JP-A-2004-287093

SUMMARY OF INVENTION

Technical Problem

As described in the foregoing PTL 1, the function of suppressing a structure break can be exerted by supporting the bridge structure portion with a support column. What is desired, however, is a technique for a further stabilization of the bridge structure, or a stabilization technique that is suitable for a bridge structure using a high-$\Delta$ optical waveguide in particular.

The present invention has been achieved in view of the foregoing technical problems. It is thus an object of the present invention to provide a thermo-optical phase shifter of bridge structure type which has a stable structure, has less adverse effect on optical characteristics and low power consumption performance, is suitable for a bridge structure using a high-$\Delta$ optical waveguide in particular, and is easy to manufacture.

Solution to Problem

To achieve the foregoing object, the present invention provides
a thermo-optical phase shifter having a composite body including an optical waveguide that includes a core and clad and a heater that is attached to the optical waveguide, the thermo-optical phase shifter characterized in that
the composite body has a bridge structure portion that is separated from a surface of a substrate by a gap and is arranged along the substrate surface, and a fixed portion that supports the bridge structure portion on the substrate and is continuous with both ends of the bridge structure portion; and the bridge structure portion has a curved shape in a plane along the surface of the substrate.

Advantageous Effects of Invention

According to the present invention, the composite body including the optical waveguide and the heater is composed of the bridge structure portion and the fixed portion which is continuous with both ends of the bridge structure portion, and the bridge structure portion is formed in a curved shape in the plane along the substrate surface. Consequently, even if the bridge structure portion is released from the restriction of the substrate and is deformed by internal stress, the deforming force can be scattered over and absorbed into the entire bridge structure portion by the curved shape slightly changing in the radius of curvature. This makes it possible to construct a low power consumption thermo-optical phase shifter with a stable structure.

According to an aspect of the present invention, the curved shape of the bridge structure portion is an arc shape or a combined shape thereof. When the bridge structure portion is formed in an arc shape having a constant radius of curvature or a combination thereof, it is possible to scatter the deforming force over the entire bridge structure portion with favorable uniformity to achieve a more stable structure.

According to an aspect of the present invention, the arc shape of the bridge structure portion forms an angle of 45° to 180° across the center of curvature. In such a range of angles, the arc shape differs from a straight line sufficiently and appropriately, which allows structural stabilization with simplified configuration.

According to an aspect of the present invention, the curved shape of the bridge structure portion has a radius of curvature of 0.05 to 1 mm. In such a range, an appropriately-miniaturized, structure-stabilized thermo-optical phase shifter can be manufactured even when the bridge structure portion constitutes a high-$\Delta$ optical waveguide.

According to an aspect of the present invention, the optical waveguide reaches or exceeds 4% in a ratio ($\Delta$) of a difference between the refractive index of the core and the refractive index of the clad with respect to the refractive index of the core. The present invention can satisfactorily achieve the foregoing object even with a thermo-optical phase shifter that uses an optical waveguide having such a particularly high $\Delta$.

According to an aspect of the present invention, the clad of the optical waveguide is made of glass material. Examples of the glass include BPSG (Boron Phosphor-doped Silica Glass), PSG (Phosphor-doped Silica Glass), and NSG (Non-doped Silica Glass). Glass materials are closely packed and have excellent stability, but with the drawback of being brittle to internal stress and a deforming force. The present invention, however, has a significant effect for improving the structural stability of articles that are made of such glass materials. According to the present invention, the structural stability can thus be secured to expand the range of applications of the glass materials having excellent advantages, so that the low power consumption thermo-optical phase shifter can fully exercise its functionality.

According to an aspect of the present invention, the core of the optical waveguide is made of SiON or Si. High-$\Delta$ optical waveguide core materials of silicon type in particular have a rich accumulation of technologies in semiconductor electronic devices, and a lot of manufacturing technologies and know-how are used to manufacture the optical waveguide device.

As described above, the optical waveguide has unique problems not seen in electronic devices. The optical waveguide has extremely thick glass films as compared to those of electronic devices. The bridge structure is supported on the substrate basically at both ends alone. Internal stress occurring from the difference in the coefficient of thermal expansion during high-temperature heat treatment therefore needs to be compensated by a shape change inside the glass films. The present invention is particularly effective for such an optical waveguide having high internal stress, and can achieve a low power consumption thermo-optical phase shifter of excellent stability and reliability.

According to an aspect of the present invention, the thermo-optical phase shifter includes at least one support portion that supports the bridge structure portion on the substrate between both ends of the bridge structure portion. The support portion can be easily formed by leaving a part of a sacrifice layer that is used when creating a gap or void for forming the bridge structure portion. According to an aspect of the present invention, the optical waveguide has a length of 0.5 to 2 mm between the fixed portion and the support portion or between mutually adjoining two of the support portions. The provision of the support portion(s) makes it possible to suppress excessive deformation of the bridge structure portion and maintain a stable structure even if the bridge structure portion is longer than 2 mm in length. More specifically, when Δ is increased to reduce the loss in the curved waveguide, the difference in the coefficient of thermal expansion between the core portion and clad portion inside the optical waveguide and the difference in the coefficient of thermal expansion between the optical waveguide portion and the substrate become greater, which increases the possibility of stress-based breakage at the time of bridge formation. The provision of the support portion(s), however, makes it possible to maintain the bridge structure with stability and construct a low power consumption thermo-optical phase shifter of excellent reliability even if the increased Δ produces a greater deforming force. Having the optical waveguide portion separated from the substrate, the bridge structure portion may become more likely to make contact with the substrate due to its own weight or other reasons if it is too large in length. The bridge structure portion can be favorably supported, however, when any 2-mm-long or shorter portion of the bridge structure portion is directly supported by a support portion or the fixed portion. This can prevent the bridge structure portion from coming into contact with the substrate, and achieve a thermo-optical phase shifter with maintaining a low power consumption structure.

BRIEF DESCRIPTION OF DRAWINGS

FIG. 17 shows sectional views of a ninth exemplary embodiment of the low power consumption thermo-optical phase shifter according to the present invention.

DESCRIPTION OF EMBODIMENTS

Hereinafter, exemplary embodiments of the present invention will be described with reference to the drawings.

First Exemplary Embodiment

Figure 1:
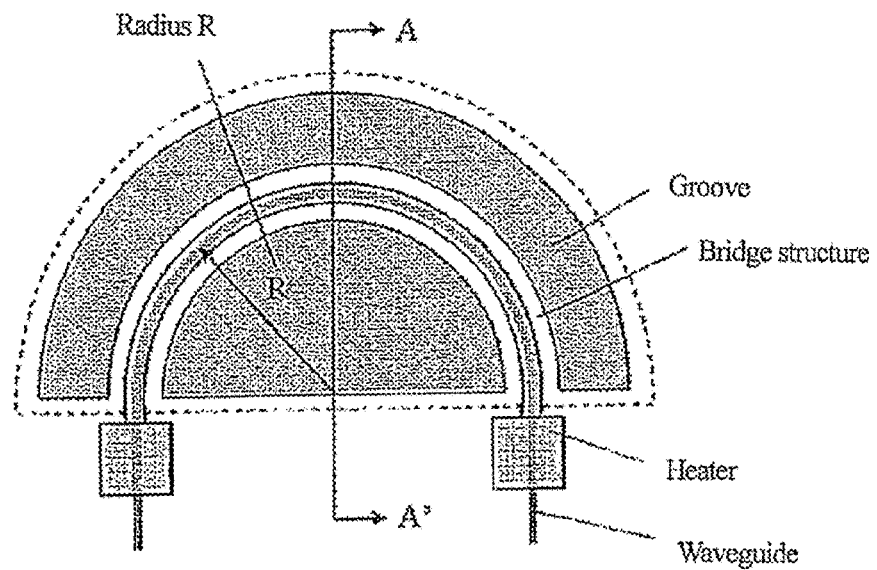
FIG. 1 is a top view of a first exemplary embodiment of a low power consumption thermo-optical phase shifter according to the present invention.
Figure 2:
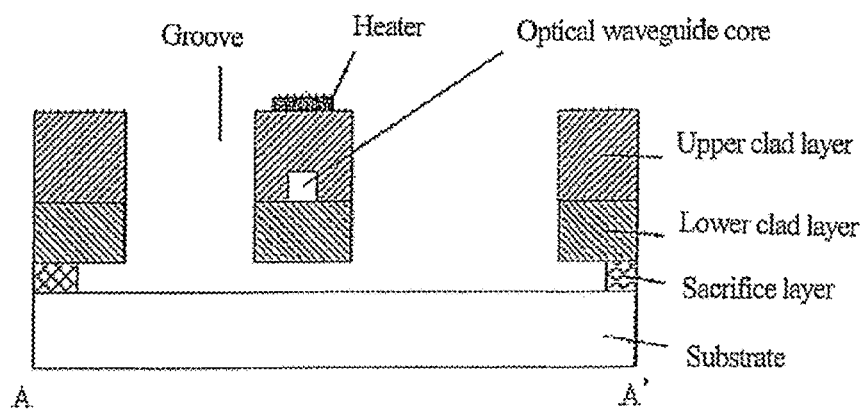
FIG. 2 is a sectional view taken along the line A-A' of FIG. 1.
Figure 3:
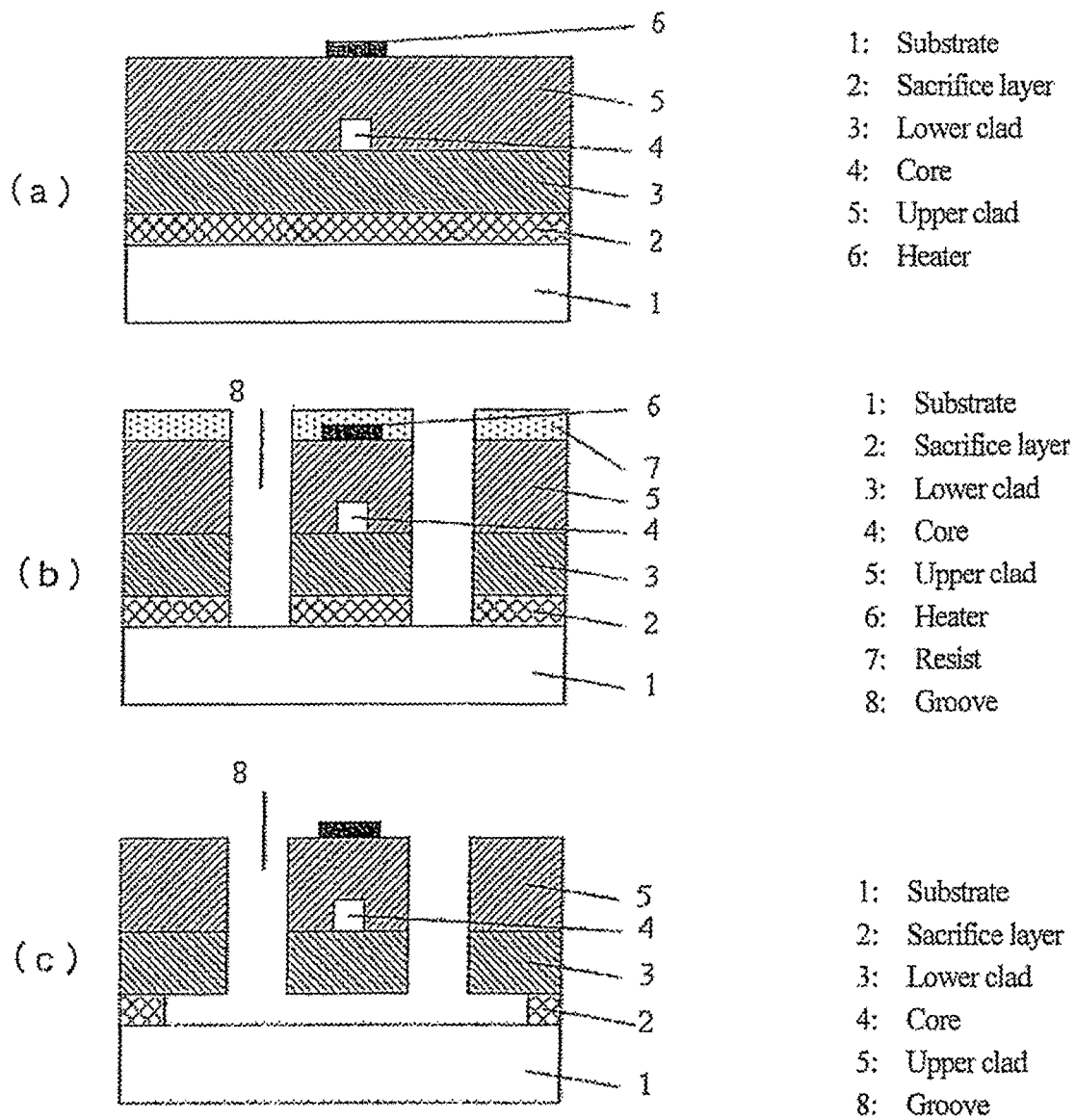
FIG. 3 shows sectional views for explaining the steps in an example of a method of manufacturing a thermo-optical phase shifter according to the first exemplary embodiment.

FIG. 1 is a top view of a first exemplary embodiment of a low power consumption thermo-optical phase shifter according to the present invention. FIG. 2 is a sectional view taken along the line A-A' of FIG. 1. FIG. 3 shows sectional views for explaining the steps in an example of a method of manufacturing a thermo-optical phase shifter according to the first exemplary embodiment.

To manufacture the thermo-optical phase shifter of the exemplary embodiment, as shown in FIG. 3(a), a sacrifice layer (made of a glass material such as PSG, phosphor-doped silica glass) 2 to be used when creating a gap or void for forming a bridge structure portion is initially deposited on an Si substrate 1. Here, the material of the substrate 1 may be changed as appropriate depending on the materials of the optical waveguide, the specifications of the end product, etc. For example, a glass substrate or polymer substrate may be used. After the deposition of the sacrifice layer 2, a lower clad layer [lower clad] (for example, made of BPSG, boron phosphor-doped silica glass) 3 and an optical waveguide core layer [core] (for example, made of SiON or Si) 4 are deposited thereon to form an optical waveguide. The core layer 4 is patterned to an intended optical circuit by photolithography and reactive ion etching (RIE). In the portion or part of the bridge structure [bridge structure portion], the core layer 4 is patterned to a semicircular arc shape as shown in FIG. 1. After the patterning of the optical waveguide core 4, an upper clad layer [upper clad] (made of a glass material such as BPSG) 5 is deposited. This completes the manufacturing of the optical circuit.

For example, when forming a high-Δ optical waveguide having Δ of 5% or so (the upper and lower clad layers having a refractive index of 1.45, and the SiON core layer a refractive index of around 1.53), the upper and lower clad layers 3 and 5 are set at a thickness of 8 μm, and the core layer 4 at a thickness of 2 μm and a width of 2 μm (i.e., 2-μm square size in a cross section perpendicular to the direction of extension of the optical waveguide). The semicircular arc shape mentioned above has a radius of curvature of 600 μm, for example. Such curvature produces little bending loss. The thickness of the sacrifice layer 2 has a large impact on the low power consumption performance, and is set to 3 μm, for example. As a result, when the thermo-optical phase shifter is applied to a Mach-Zehnder optical switch, for example, the required power consumption can be reduced to approximately 1/20 (approximately 20 mW) as compared to heretofore.

A thin film metal heater 6 for heating the optical waveguide core is formed on the surface of the upper clad layer 5 along the optical waveguide core layer 4. A composite body is thus formed, including an optical waveguide that is composed of the core layer 4 and the upper and lower clad layers 3 and 5, and the heater 6 that is attached to the optical waveguide. The heater 6 may be formed in a semicircular arc shape having the radius of curvature corresponding to that of the core layer 4, with a length of approximately 1.9 mm, a width of 5 μm, and a thickness of 0.3 μm. The heater 6 may be made of metal materials that are commonly used for semiconductor devices such as chromium, titanium, platinum, gold, aluminum, TiN, and TaN singly or in any combination.

As shown in FIG. 3(*b*), a resist 7 is applied to the surface of the upper clad layer 5 so as to cover even the thin film metal heater 6, and is patterned to form an etching mask. Using the mask, RIE (reactive ion etching) is performed to form grooves 8 which penetrate the upper clad layer 5 and the lower clad layer 3 to reach the sacrifice layer 2, on both sides of the optical waveguide core layer 4 of semicircular arc shape. The groove width may be at least 100 μm or greater, for example. Such a width can satisfactorily prevent the heat of the optical waveguide remaining between the grooves 8 on both sides from being transferred to and absorbed by the adjoining clad layer portions by air heat transfer. The smaller the width of the optical waveguide portion, the more advantageous it is in view of reducing the power consumption. For example, the width is set at 15 μm in consideration of such factors as the influence of patterning errors and the influence of the sacrifice layer etching process.

Subsequently, as shown in FIGS. 3(*b*) and 3(*c*), the sacrifice layer 2 is removed from the areas corresponding to the grooves 8 and the area directly under the optical waveguide portion. In the present exemplary embodiment, where the sacrifice layer 2 is made of PSG and the upper and lower clad layers 3 and 5 are made of BPSG, buffered hydrogen fluoride aqueous solution (BHF) is optimum for the etching solution for etching the sacrifice layer.

When the BHF etching of the sacrifice layer 2 is thus completed, the composite body including the optical waveguide and the heater 6 attached to the optical waveguide forms a bridge structure (bridge structure portion) which is separated from the surface of the substrate 1 by a gap and is arranged along the substrate surface. The bridge structure portion has a curved shape, or arc shape, or semicircular arc shape in particular in a plane along the surface of the substrate 1. FIG. 3(*c*) is substantially the same as FIG. 2.

Now, as shown in FIG. 1, both ends of the bridge structure portion of arc shape are continuous with the remaining portion, or fixed portion, of the composite body that includes the optical waveguide and the heater 6 attached to the optical waveguide. The fixed portion supports the bridge structure portion on the substrate 1. Both ends of the arc-shaped heater 6 are extended up to the fixed portion, where the ends are formed in the shape of rectangular electrode pads.

In the thermo-optical phase shifter manufactured as described above, the bridge structure portion has a semicircular arc shape in a plane along the surface of the substrate 1. Consequently, even when the bridge structure portion is separated from the surface of the substrate 1 by a gap in the process of manufacturing, the stress is evenly distributed and released over the entire bridge structure portion of semicircular arc shape, whereby a break of the bridge structure portion is suppressed. Since the stress is already released, high stress hardly occurs in a drying step that follows a cleaning step in the process of manufacturing. This makes it possible to construct the bridge while maintaining the desired structure satisfactorily.

In contrast, if the bridge structure portion has a straight shape as in the foregoing PTL1, large forces can act on both ends of the bridge structure portion, i.e., where the bridge structure portion is supported on the substrate, and the bridge structure portion may be broken when the bridge structure portion is separated from the surface of the substrate by a gap in the process of manufacturing. Even if some bridge structure portion remains unbroken, the surface tension of liquids can sometimes cause an additional deformation force and break the bridge structure portion in the subsequent cleaning step and the step of removing and drying the liquids from the gap. As a result, it is difficult to form the bridge structure stably in the case of a high-Δ optical waveguide.

Second Exemplary Embodiment

Figure 4:
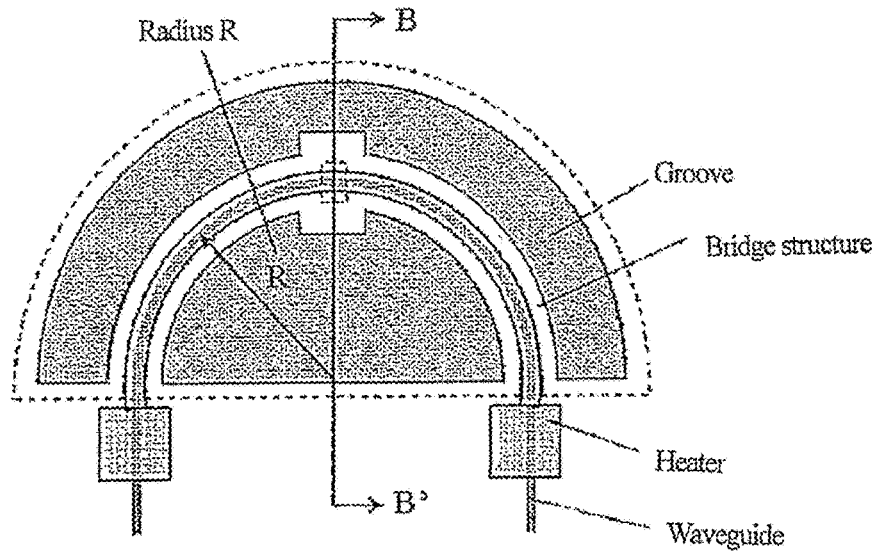
FIG. 4 is a top view of a second exemplary embodiment of the low power consumption thermo-optical phase shifter according to the present invention.
Figure 5:
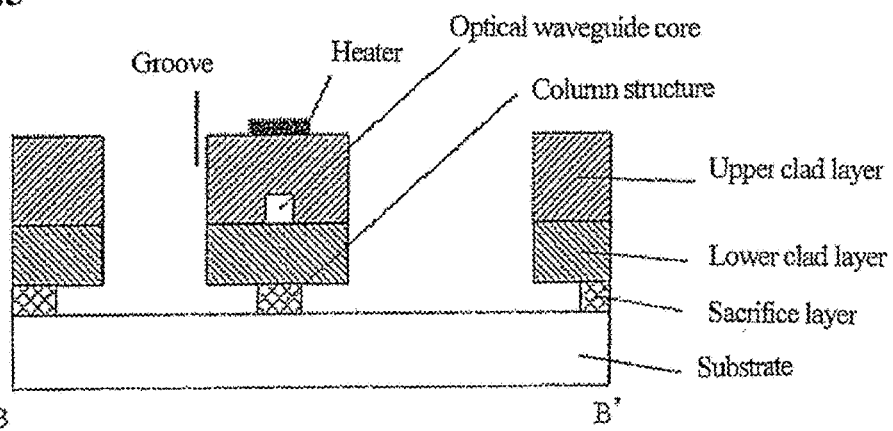
FIG. 5 is a sectional view taken along the line B-B' of FIG. 4.

FIG. 4 is a top view of a second exemplary embodiment of the low power consumption thermo-optical phase shifter according to the present invention. FIG. 5 is a sectional view taken along the line B-B' of FIG. 4.

Figure 6:
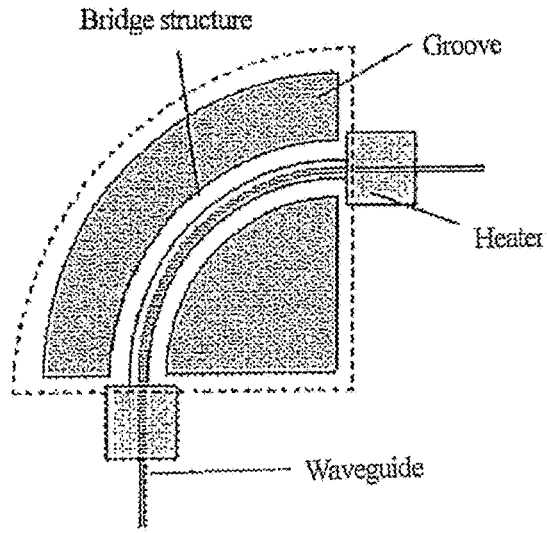
FIG. 6 is a top view of a low power consumption thermo-optical phase shifter pertaining to the second exemplary embodiment.

The present exemplary embodiment includes a support portion (column structure) that supports the same bridge structure portion as in the foregoing first exemplary embodiment on the substrate between both ends. That is, the bridge structure portion is partly connected with the substrate through the column structure. Such a column structure, as shown in FIG. 4, can be formed directly under the central area of the bridge structure portion of semicircular arc shape by forming a broad portion in the central area in advance and selecting the sacrifice layer etching time appropriately. The column structure is provided for the following reason. Suppose that the thermo-optical phase shifter including a high-Δ optical waveguide is desirably formed so that bridge structure portion is formed continuously at a length over 2 mm for design or other reasons. If simply formed so, the bridge structure portion can sometimes come into contact with the substrate because of the self weight of the bridge structure portion, the surface tension of the liquids in the drying step, and so on. The column structure is provided in order to avoid such situations. For example, when the bridge structure portion of semicircular arc shape shown in FIG. 4 has a radius of curvature of 1 mm, the bridge structure portion reaches approximately 3 mm in length. A column structure is then formed in the longitudinal center (i.e., at a position of approximately 1.5 mm from either end) to support the bridge structure portion so that any 2-mm-long portion of the bridge structure portion is supported by at least one support portion. This is virtually equivalent, in view of supporting the bridge structure portion, to a combination of two bridge structure portions of quarter-circular arc shape as shown in FIG. 6. The structure of the present exemplary embodiment is preferably used, however, since the use of the column structure minimizes the increase in power consumption in consideration of thermal insulation properties.

Third Exemplary Embodiment

Figure 7:
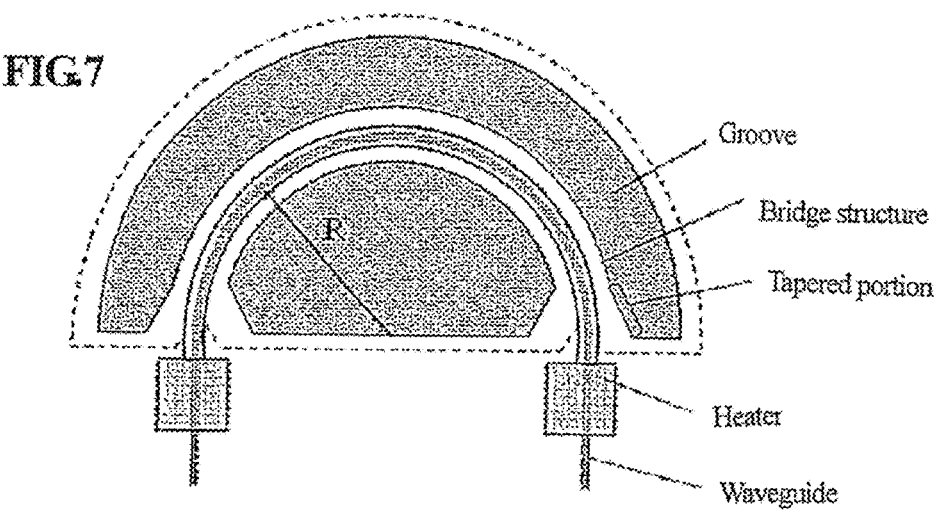
FIG. 7 is a top view of a third exemplary embodiment of the low power consumption thermo-optical phase shifter according to the present invention.

FIG. 7 is a top view of a third exemplary embodiment of the low power consumption thermo-optical phase shifter according to the present invention.

While the shape of the bridge structure portion according to the exemplary embodiment of FIG. 1 provides a sufficient structural stability, there occurs the phenomenon that deforming forces slightly concentrate on both ends of the bridge structure portion where the optical waveguide changes in the radius of curvature. To minimize the risk of a structural break of the high-Δ optical waveguide having high internal stress in particular, it is preferable that both ends of the bridge structure portion be formed in a tapered shape so as to decrease width toward the central area as shown in FIG. 7. The tapered shape may be of exponentially decreasing width, stepwise decreasing width, or the like aside from constantly decreasing width as shown in FIG. 7. Any of the tapered shapes provides the effect of structural stabilization.

Fourth Exemplary Embodiment

Figure 8:
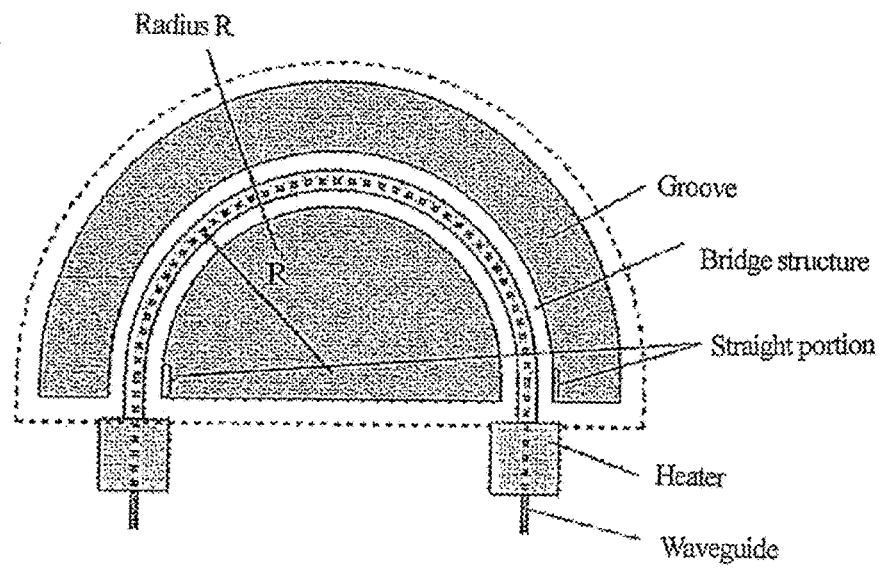
FIG. 8 is a top view of a fourth exemplary embodiment of the low power consumption thermo-optical phase shifter according to the present invention.

FIG. 8 is a top view of a fourth exemplary embodiment of the low power consumption thermo-optical phase shifter according to the present invention.

In the present exemplary embodiment, the bridge structure portion includes a curve-shaped portion of semicircular arc shape and two straight-shaped portions (straight portions) that are continuous with the respective ends of the curve-shaped portion. If the curve-shaped portion can satisfactorily absorb stress deformations, the bridge structure portion may include straight portions and can achieve sufficient structural stability without deforming forces concentrating on both ends. This configuration is particularly suited to increasing the length of the thermo-optical phase shifter and using an optical waveguide of curved shape with a smaller radius of curvature to reduce the size of the optical circuit, i.e., is suitable for constructing a small-sized highly-integrated optical device.

Fifth Exemplary Embodiment

Figure 9:
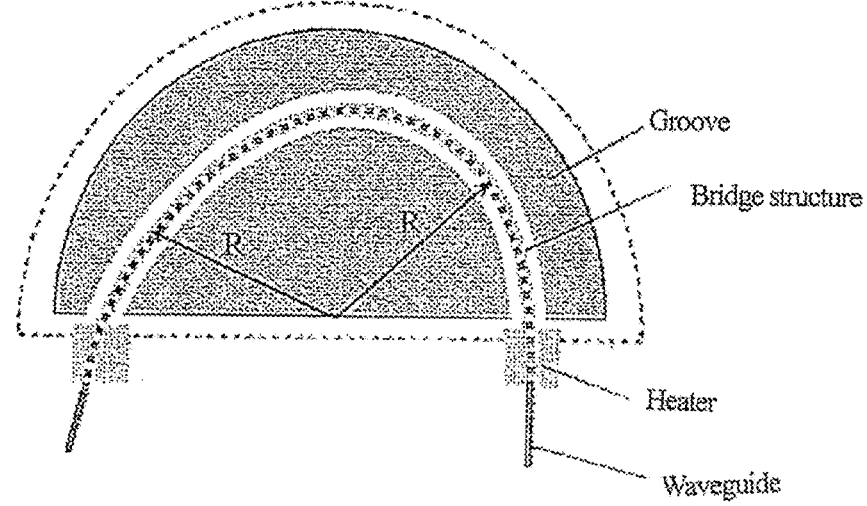
FIG. 9 is a top view of a fifth exemplary embodiment of the low power consumption thermo-optical phase shifter according to the present invention.

FIG. 9 is a top view of a fifth exemplary embodiment of the low power consumption thermo-optical phase shifter according to the present invention.

In the present exemplary embodiment, the bridge structure portion of curved shape is configured so that the radius of curvature is not constant but changes along the direction of light propagation of the optical waveguide, i.e., the direction of extension of the bridge structure portion (in FIG. 9, mutually different radii of curvature are shown as R and R'). Since in the present exemplary embodiment the stress distribution varies from one location of the bridge structure portion to another, the risk of breakage increases as compared to the exemplary embodiment of FIG. 1. For the sake of higher integration of optical circuits, however, higher design flexibility is preferable and such design as in the present exemplary embodiment may be made. Note that the structural stability is significantly improved if compared to the configuration of the foregoing PTL1.

Sixth Exemplary Embodiment

Figure 10:
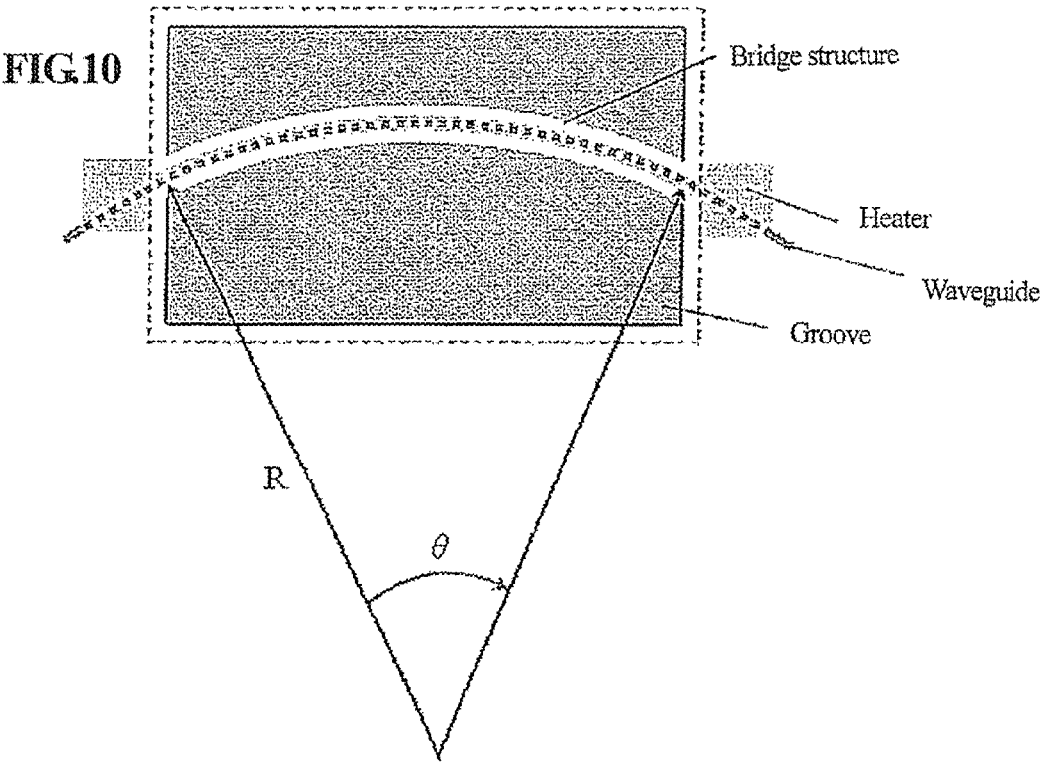
FIG. 10 is a top view of a sixth exemplary embodiment of the low power consumption thermo-optical phase shifter according to the present invention.

FIG. 10 is a top view of a sixth exemplary embodiment of the low power consumption thermo-optical phase shifter according to the present invention.

Figure 11:
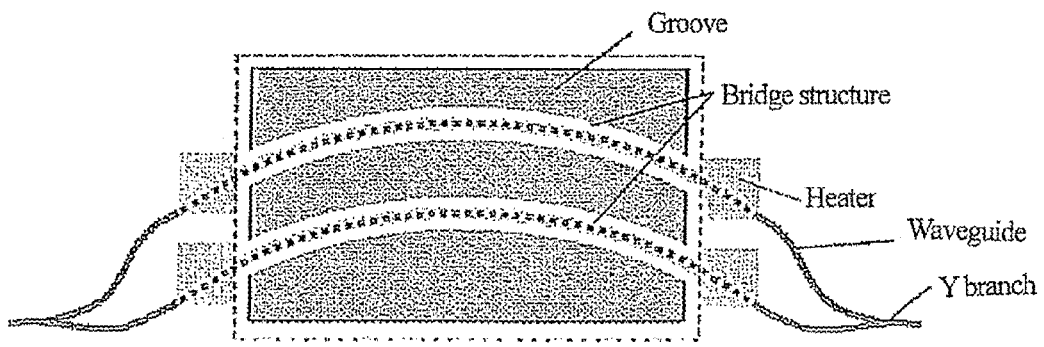
FIG. 11 is a top view showing a first Mach-Zehnder interferometer optical circuit to which the low power consumption thermo-optical phase shifter of the sixth exemplary embodiment is applied.
Figure 12:
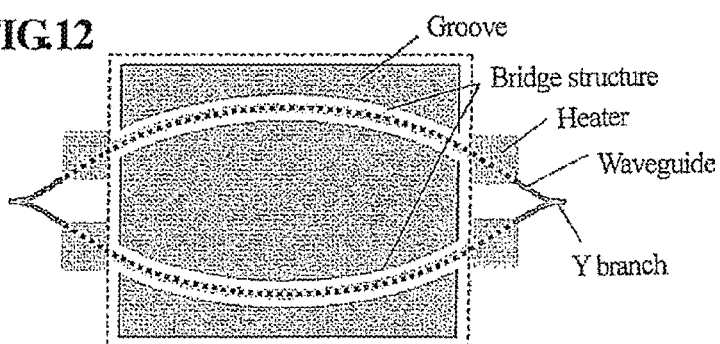
FIG. 12 is a top view showing a second Mach-Zehnder interferometer optical circuit to which the low power consumption thermo-optical phase shifter of the sixth exemplary embodiment is applied.

In the present exemplary embodiment, the bridge structure portion of curved shape has an arc shape with a constant radius of curvature R, and forms an angle θ smaller than in the foregoing embodiments (for example, 180° or 90°) across the center of curvature. The angle θ may be 45°, for example. Having a certain radius of curvature, the bridge structure portion can scatter stress deformations in the direction toward the arc center or in the opposite direction if arc length is sufficient, depending on the stress relationship with the substrate. The structure of the present exemplary embodiment is particularly useful for Mach-Zehnder interferometers that are used in optical switches or variable optical attenuators such as shown in FIGS. 11 and 12. More specifically, when constructing a large-scale optical switch matrix, a large number of Mach-Zehnder interferometers are arranged in parallel. Considering the layout efficiency alone, the two waveguide arms of a Mach-Zehnder interferometer are then preferably straight-shaped. The straight shape, however, has limitations in forming desired lengths of bridge structure portions while preventing a structural break due to stress deformations. The arm structure therefore preferably includes bridge structure portions of arc shape such as in the present exemplary embodiment since stress deformations can be scattered. Using bridge structure portions of gentle arc shape for all the Mach-Zehnder interferometers can achieve miniaturization and integration comparable to Mach-Zehnder interferometers with straight-shaped waveguide arms.

Seventh Exemplary Embodiment

Figure 13:
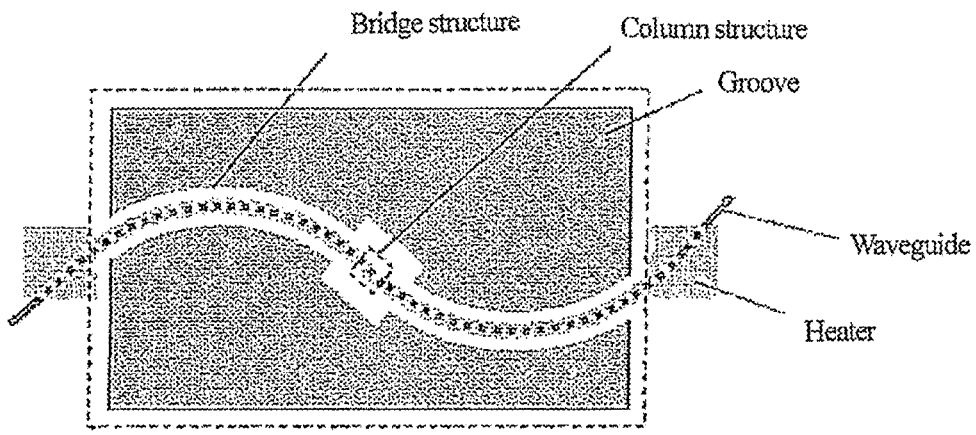
FIG. 13 is a top view of a seventh exemplary embodiment of the low power consumption thermo-optical phase shifter according to the present invention.

FIG. 13 is a top view of a seventh exemplary embodiment of the low power consumption thermo-optical phase shifter according to the present invention.

In the present exemplary embodiment, two bridge structure portions of arc shape are joined into an S shape, and the foregoing column structure for supporting the bridge structure portions is formed at the point of inflection in the middle of the S shape. Such a structure is useful in reducing the size of the Mach-Zehnder interferometer according to the sixth exemplary embodiment in the width direction with respect to the direction of light propagation. This can widen the range of choices whether to reduce the longitudinal size as in FIG. 11 or to reduce the widthwise size as in FIG. 13 depending on the design guideline of the device size, thereby allowing more appropriate miniaturization and integration.

Eighth Exemplary Embodiment

Figure 14:
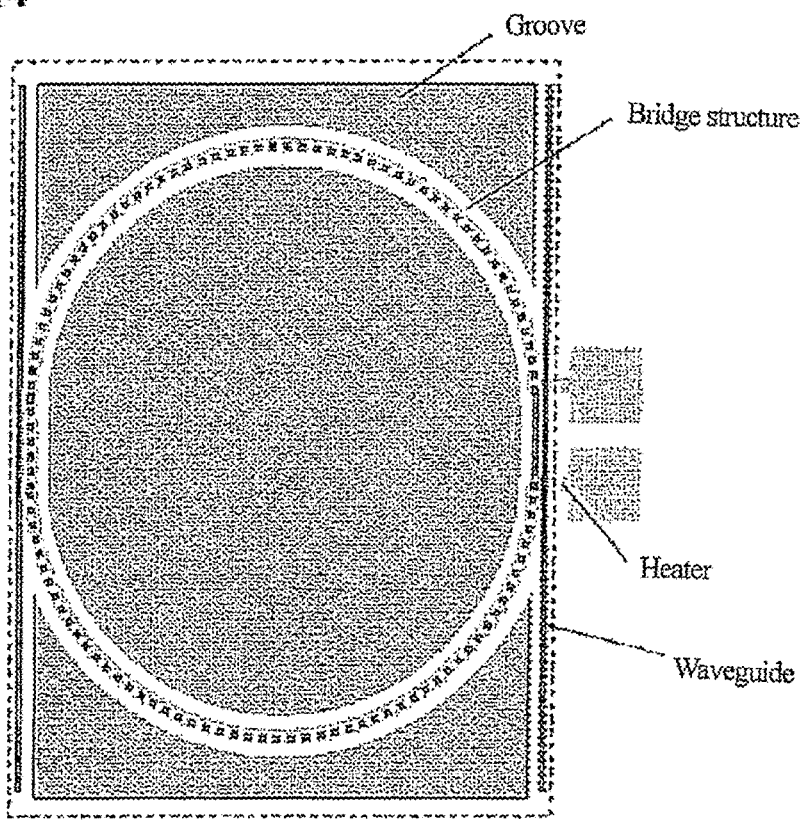
FIG. 14 is a top view of a first optical ring resonator circuit to which an eighth exemplary embodiment of the low power consumption thermo-optical phase shifter according to the present invention is applied.

FIG. 14 is a top view of an eighth exemplary embodiment of the low power consumption thermo-optical phase shifter according to the present invention.

Figure 15:
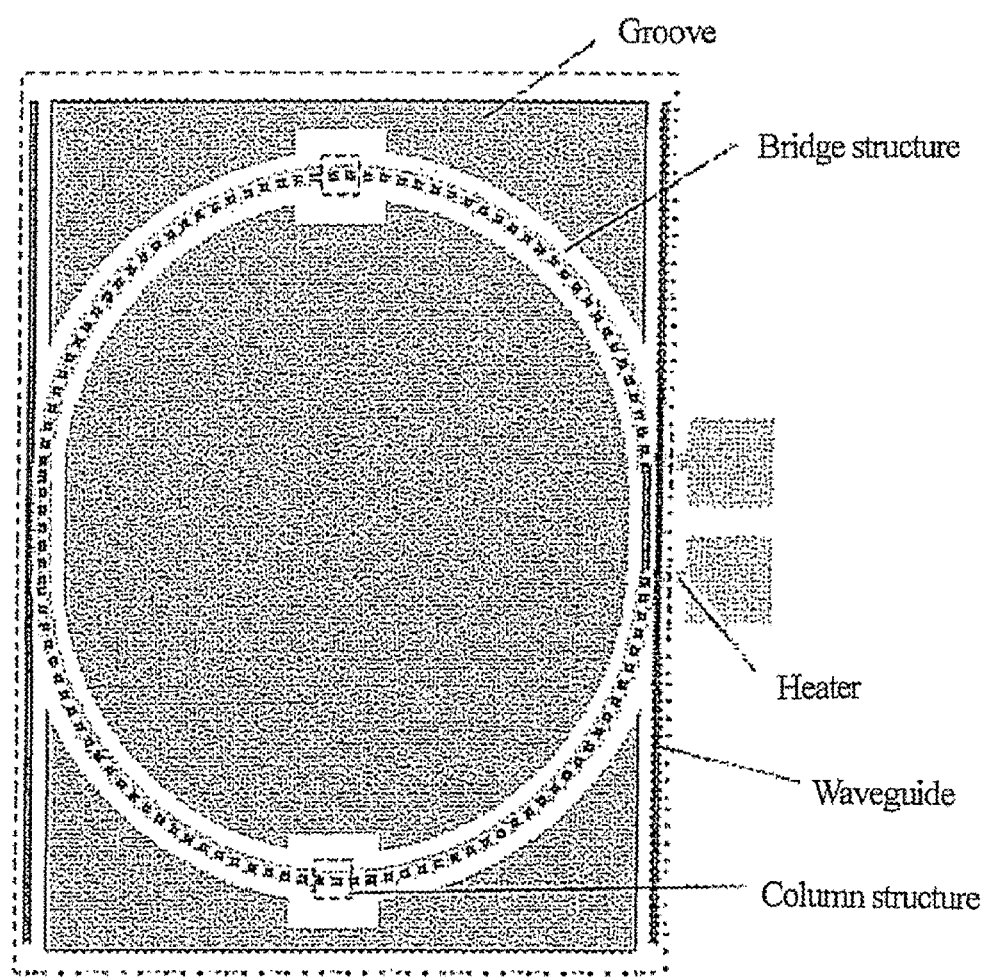
FIG. 15 is a top view of a second optical ring resonator circuit to which the eighth exemplary embodiment is applied.
Figure 16:
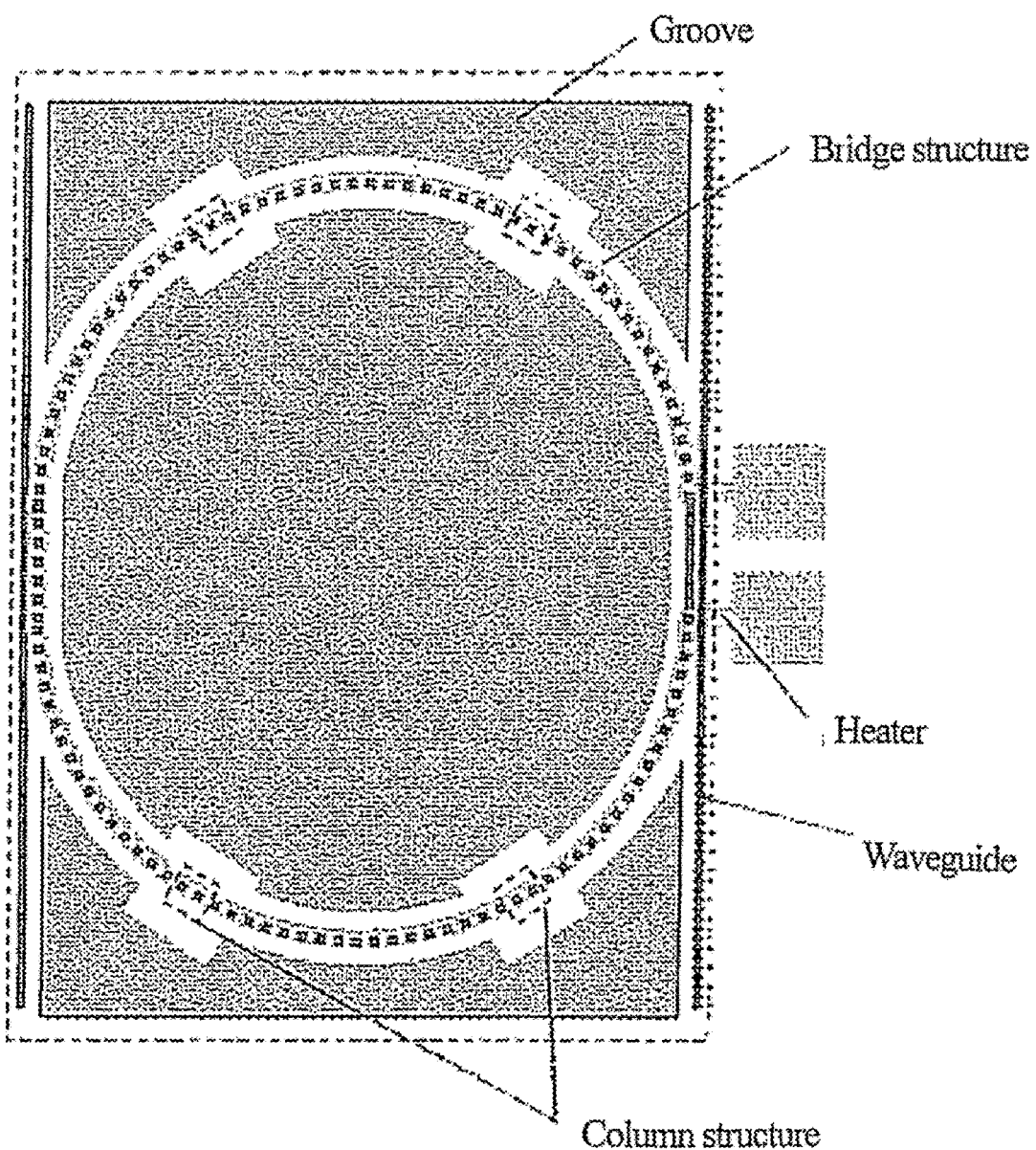
FIG. 16 is a top view of a third optical ring resonator circuit to which the eighth exemplary embodiment is applied.

The present exemplary embodiment illustrates the application of the low power consumption thermo-optical phase shifter to a ring resonator waveguide which is an extremely-useful functional optical circuit of a high-Δ optical waveguide. If the semicircular waveguide portions are appropriately designed in length, the ring waveguide portion can absorb stress deformations to achieve both stable structure and optical characteristics. Suppose that the ring's FSR (Free Spectral Range)=c/($n_{eff}$×L) is designed to be 100 GHz (where c: the speed of light, $n_{eff}$: the effective refractive index of the waveguide, L: the total length of the ring waveguide). Given the optical waveguide has an effective refractive index of 1.5, the length of half a circle of the ring waveguide is approximately 1 mm (the total length of the ring waveguide is approximately 2 mm). According to the exemplary embodiment, semicircular parts of 2 mm or smaller in length can satisfactorily release deforming stresses and can stably maintain the bridge shape as well. When forming a ring resonator of FSR=25 GHz with the exemplary embodiment, the length of the semicircular bridge-shaped waveguides is approximately 4 mm (the total length of the ring waveguide is approximately 8 mm). In such a case, as shown in FIG. 15, the foregoing column structure may be formed in the centers of the respective semicircular parts so that the bridge structure portions are favorably supported. As shown in FIG. 16, two column structures may be formed for each of the semicircular parts. It should be appreciated that the number of column structures or support portions is preferably reduced in view of the low power consumption performance.

Ninth Exemplary Embodiment

FIG. 17 shows sectional views of a ninth exemplary embodiment of the low power consumption thermo-optical phase shifter according to the present invention.

In the present exemplary embodiment, Si is used as the material of the optical waveguide core layer. FIG. 17(*a*) shows a thermo-optical phase shifter that uses an optical waveguide of channel type, which confines light into the core extremely strongly and is suited to small-sized highly-integrated optical devices. FIG. 17(*b*) shows a thermo-optical phase shifter that uses an optical waveguide of rib type, which only has the light confining effect equivalent to that of SiON but with a smaller propagation loss as compared to the optical waveguide of channel type. Since Si has a refractive index temperature dependency more than 10 times that of SiON, a low power consumption structure like that of the present exemplary embodiment can be employed to achieve excellent low power consumption performance. The Si core waveguide is manufactured by using an SOI (Silicon on Insulator) substrate which has fewer crystal defects. Here, the sacrifice layer is made of a silicon substrate, and the lower clad a BOX (Buried Oxide) layer. After the optical circuit patterning of the core layer, the upper clad layer is deposited to form a buried waveguide. Subsequently, the metal wire heater is formed. The method of forming a bridge structure is the same as in the exemplary embodiment of FIG. 3. Grooves to reach the silicon substrate are formed in both sides of the optical waveguide pattern by RIE, followed by selective etching of the silicon substrate. The selective etching needs to be isotropic so that the etching also proceeds in the horizontal directions of the substrate. For example, wet etching with a fluoric/nitric/acetic acid mixed solution or the like may be used.

This application is the National Phase of PCT/JP2008/053608 filed on Feb. 29, 2008, which is based upon and claims the benefit of priority from prior Japanese Patent Application No. 2007-60167, filed with Japan Patent Office on Mar. 9, 2007, the entire contents of which are incorporated herein by reference.

REFERENCE SIGNS LIST

1: Substrate
2: Sacrifice layer
3: Lower clad layer
4: Core layer
5: Upper clad layer
6: Heater
7: Resist
8: Groove

What is claimed is:

1. A thermo-optical phase shifter having a composite body including an optical waveguide that includes a core and clad and a heater that is attached to the optical waveguide, the thermo-optical phase shifter characterized in that
the composite body has a bridge structure portion that is separated from a surface of a substrate by a gap and is arranged along the substrate surface, and a fixed portion that supports the bridge structure portion on the substrate and is continuous with both ends of the bridge structure portion; and
the bridge structure portion has a curved shape in a plane along the surface of the substrate,
wherein the curved shape of the bridge structure portion has a radius curvature of 0.05 to 1 mm.

2. The thermo-optical phase shifter according to claim 1, wherein the curved shape of the bridge structure portion is an arc shape or a combined shape thereof.

3. The thermo-optical phase shifter according to claim 2, wherein the arc shape of the bridge structure portion forms an angle of 45° to 180° across the center of curvature.

4. The thermo-optical phase shifter according to claim 1, wherein the optical waveguide reaches or exceeds 4% in a ratio of difference between the refractive index of the core and the refractive index of the clad with respect to the refractive index of the core.

5. The thermo-optical phase shifter according to claim 1, wherein the clad of the optical waveguide is made of glass material.

6. The thermo-optical phase shifter according to claim 1, wherein the core of the optical waveguide is made of SiON or Si.

7. The thermo-optical phase shifter according to claim 1, wherein the thermo-optical phase shifter includes at least on support portion that supports the bridge structure portion on the substrate between both ends of the bridge structure portion.

8. The thermo-optical phase shifter according to claim 7, wherein the optical waveguide has a length of 0.5 to 2 mm between the fixed portion and the support portion or between mutually adjoining two of the support portions.

9. A thermo-optical phase shifter having a composite body including an optical waveguide that includes a core and clad and a heater that is attached to the optical waveguide, the thermo-optical phase shifter characterized in that
the composite body has a bridge structure portion that is separated from a surface of a substrate by a gap and is arranged along the substrate surface, and a fixed portion that supports the bridge structure portion on the substrate and is continuous with both ends of the bridge structure portion; and
the bridge structure portion has a curved shape in a plane along the surface of the substrate,
wherein the optical waveguide reaches or exceeds 4% in a ratio of a difference between the refractive index of the core and the refractive index of the clad with respect to the refractive index of the core.

10. The thermo-optical phase shifter according to claim 9, wherein the curved shape of the bridge structure portion is an arc shape or a combined shape thereof.

11. The thermo-optical phase shifter according to claim 10, wherein the arc shape of the bridge structure portion forms an angle of 45° to 180° across the center of curvature.

12. The thermo-optical phase shifter according to claim 9, wherein the clad of the optical waveguide is made of glass material.

13. The thermo-optical phase shifter according to claim 9, wherein the core of the optical waveguide is made of SiON or Si.

14. The thermo-optical phase shifter according to claim 9, wherein the thermo-optical phase shifter includes at least one support portion that supports the bridge structure portion on the substrate between both ends of the bridge structure portion.

15. The thermo-optical phase shifter according to claim 14, wherein the optical waveguide has a length of 0.5 to 2 mm between the fixed portion and the support portion or between mutually adjoining two of the support portions.

16. A thermo-optical phase shifter having a composite body including an optical waveguide that includes a core and clad and a heater that is attached to the optical waveguide, the thermo-optical phase shifter characterized in that the composite body has a bridge structure portion that is separated from a surface of a substrate by a gap and is arranged along the substrate surface, and a fixed portion that supports the bridge structure portion on the substrate and is continuous with both ends of the bridge structure portion; and the bridge structure portion has a curved shape in a plane along the surface of the substrate, wherein the thermo-optical phase shifter includes at least one support portion that supports the bridge structure portion on the substrate between both ends of the bridge structure portion; and wherein the optical waveguide has a length of 0.5 to 2 mm between the fixed portion and the support portion or between mutually adjoining two of the support portions.

17. The thermo-optical phase shifter according to claim 16, wherein the curved shape of the bridge structure portion is an arc shape or a combined shape thereof.

18. The thermo-optical phase shifter according to claim 17, wherein the arc shape of the bridge structure portion forms an angle of 45° to 180° across the center of curvature.

19. The thermo-optical phase shifter according to claim 16, wherein the clad of the optical waveguide is made of glass material.

20. The thermo-optical phase shifter according to claim 16, wherein the core of the optical waveguide is made of SiON or Si.

* * * * *